United States Patent [19]
Kron

[11] 3,790,016
[45] Feb. 5, 1974

[54] INSTRUMENTED NEWBORN NURSING SYSTEM

[75] Inventor: Reuben E. Kron, Narberth, Pa.

[73] Assignee: The Trustees of the University of Pennsylvania, Philadelphia, Pa.

[22] Filed: Dec. 13, 1971

[21] Appl. No.: 207,360

[52] U.S. Cl. ............................ 215/11 R, 128/252
[51] Int. Cl. ............................................ A61j 9/00
[58] Field of Search.. 215/11 R, 11 B; 128/2 S, 252, 128/2 R

[56] References Cited
UNITED STATES PATENTS

| | | | |
|---|---|---|---|
| 2,616,581 | 11/1952 | Madsen et al. | 215/11 B |
| 805,641 | 11/1905 | Gallagher | 215/11 B |
| 2,680,441 | 6/1954 | Krammer | 215/11 R |

*Primary Examiner*—George E. Lowrance
*Assistant Examiner*—Stephen Marcus

[57] ABSTRACT

An infant nursing device comprising a chamber for containing liquid contiguous to a nipple having an air inlet passage communicating from the ambient atmosphere to the chamber, a liquid metering passage communicating from the chamber and through a centrally protruding exterior portion of the nipple, and either a pressure indicative passage communicating from the centrally protruding exterior portion to another region or means communicating with the liquid metering passage for measuring the rate of flow therein. All are so arranged that the device is conveniently positionable for delivery of the liquid to an infant whose oral cavity surrounds the centrally protruding exterior portion of the nipple, with the air inlet passage communicating with the ambient atmosphere in substantially the same horizontal plane at which the exterior end of the liquid conductive passage is positioned, and with the inner ends of the liquid metering and the air inlet passages below the level of the liquid as long as the liquid occupies a substantial portion of the space in the chamber.

6 Claims, 6 Drawing Figures

INSTRUMENTED NEWBORN NURSING SYSTEM

BACKGROUND OF THE INVENTION

It has long been clinically recognized that the characteristics of behavior reflect the functional integrity of the central nervous system. To study the diagnostic value of early behavioral patterns it is necessary to have reliable methods for measuring behavior. There are, however, few precise methods that are applicable to newborn infants.

The effectiveness of the newborn's feeding behavior is of prime concern to the neonatologist and the pediatrician. This feeding behavior is reflected in the newborn's weight gain and general state of health and vitality. The vigor of a newborn's sucking can be assessed by the pediatrician placing a gloved finger into the baby's mouth. With experience, the physician learns to recognize deviations from normal in the intensity and rhythm of sucking.

An instrumented method of measuring the intensity and rhythm of the baby's sucking makes such clinical observation more sensitive and objective, and this facilitates more careful diagnosis of abnormalities in the sucking response. A technique for recording nutritive infant sucking has been developed which permits the objective measurement of infant adaptive behavior as early as the first day of life. The technique and some of the studies carried on and results obtained with it are described in the following publications.

A. Kron, R. E., "The Effect of Arousal and of Learning Upon Sucking Behavior in the Newborn." In Recent Advances in Biological Psychiatry (Vol. X), by Wortis, J., Ed. Plenum, New York, 1968, p. 302.

B. Kron, R. E.: Instrumental conditioning of nutritive sucking behavior in the newborn, in: Wortis, J. (ed.) Recent Advances in Biological Psychiatry, Vol. IX, Plenum Press, New York, 1967, p. 295.

C. Kron, R. E., Stein, M., and Goddard, K.E.: A method of measuring sucking behavior of newborn infants, Psychosomat, Med. 25:181, 1963.

D. Kron, R. E., Stein, M., and Goddard, K.E.: Newborn sucking behavior affected by obstetric sedation, Pediatrics 37:1012, 1966.

E. Kron, R.E., Stein, M. Goddard, K.E., and Phoenix, M.D.: Effect of nutrient upon the sucking behavior of newborn infants, Psychosomat. Med. 29:24, 1967.

F. Kron, R. E., Kron, V. S., and Phoenix, M.D.: The influence of environmental factors upon early feeding behavior: the effect of interfeeding interval on nutritive sucking in the newborn (in preparation).

G. Kron, R. E., Ipsen, J., and Goddard, K. E.: Consistent individual differences in the nutritive sucking behavior of the human newborn, Psychosomat. Med. 30:151, 1968.

H. Kron, R. E. and Litt, M.: Fluid mechanics of nutritive sucking in behavior: the suckling infant's oral apparatus analyzed as a hydraulic pump. Medical and Biological Engineering, 9:45, 1971.

I. Kron, R. E.: The predictive value of measures of earliest oral behavior. In Second Symposium on Oral Sensation and Perception (Ed. Bosma, J. J.) Springfield, Ill. Charles C. Thomas, 1970, p. 234.

J. Kron, R. E.: Prognostic significance of sucking dysrythmias. Third Symposium on Oral Sensation and Perception (Ed. Bosma, J. J.), (in preparation).

The equipment available heretofore for use in the technique is rather bulky. It is the primary object of the present invention to facilitate the measurement of sucking intensity and rhythm by replacing the more cumbersome experimental equipment used in the past so that routine measurement of infant behavior can be made in an objective and economical way in the newborn nursery.

SUMMARY OF THE INVENTION

A typical infant nursing device according to the present invention comprises a chamber for containing liquid therein, a nipple contiguous to the chamber and having an air conductive passage communicating from the ambient atmosphere to the chamber, and a liquid conductive passage communicating from the chamber and through a centrally protruding exterior portion of the nipple; the chamber, nipple, and passages being so arranged that the device is conveniently positionable for delivery of the liquid to an infant whose oral cavity surrounds the centrally protruding exterior portion of the nipple, with the air conductive passage communicating with the ambient atmosphere in substantially the same horizontal plane at which the exterior end of the liquid conductive passage is positioned, and with the inner ends of the liquid conductive and the air conductive passages below the level of the liquid as long as the liquid occupies a substantial portion of the space in the chamber.

The device may comprise also a pressure indicative passage communicating from the centrally protruding exterior portion to a region spaced therefrom. The end of the pressure indicative passage at the centrally protruding exterior portion of the nipple preferably is closely adjacent the exterior end of the liquid conductive passage, and the pressure indicative passage normally is filled with liquid. The device typically comprises also means for measuring the pressure in the pressure indicative passage. Such means may comprise a pressure transducer in the pressure indicative passage; or the pressure indicative passage may extend through the nipple to a region outside the nipple and chamber, and the measuring means may comprise a pressure transducer connected to the extended end of the pressure indicative passage.

Typical pressure measuring means comprises a diaphragm and means responsive to deflection thereof such as a strain gage. Other typical deflection responsive means comprises means for varying pressure differential in a plurality of fluid means and indicating means responsive to the pressure differential.

The device may comprise also means for selectively opening and closing the liquid conductive passage. Typically such selective means comprises a member that is movable in response to magnetic force on one side of the liquid conductive passage, electromagnetic means on the opposite side, and means for energizing the electromagnetic means.

Instead of having a pressure indicative passage, the device may comprise also means for measuring the rate of flow in the liquid conductive passage. Typical flow measuring means comprises means responsive to the temperature in the liquid conductive passage. The temperature responsive means typically comprises a thermistor, means for maintaining the thermistor at a substantially constant temperature, and means responsive thereto for indicating the rate of flow. Or it may comprise a thermistor, means for providing a substantially constant current in the thermistor, and means responsive thereto for indicating the rate of flow.

Another typical flow measuring means comprises an input passage communicating with one side of the liquid conductive passage for passing fluid across it, a plurality of output passages communicating with the opposite side of the liquid conductive passage in the vicinity of the input passage, and indicating means responsive to differential pressures in the output passages such as a differential pressure transducer communicating with each output passage and a recorder responsive to the transducer.

Other types of flowmeters which might be used include rotameter, electroturbinometer, bristle and pendulum flowmeter, ultrasonic flowmeter, traveling markers, etc., as referenced in "Handbook of Physiology," Circulation, Volume II, American Physiological Society, Baltimore, Md., Williams and Wilkins, 2:1294, 1963.

DESCRIPTION OF PREFERRED EMBODIMENTS

Figure 1:
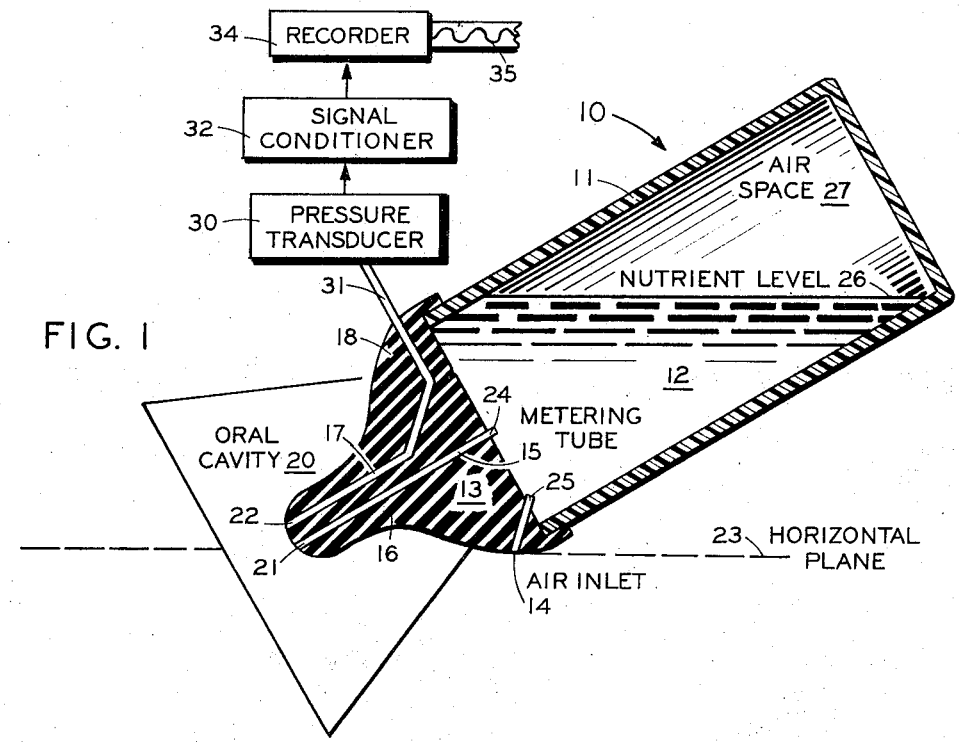
Fig. 1 is a partly schematic and partly sectional view of typical apparatus according to this invention.

Referring particularly to FIG. 1, an infant nursing device 10 according to the present invention comprises a chamber 11 for containing liquid 12 therein, a nipple 13 contiguous to the chamber 11 and having an air conductive passage or air inlet 14 communicating from the ambient atmosphere to the chamber 11, a liquid conductive passage or metering tube 15 communicating from the chamber and through a centrally protruding exterior portion 16 of the nipple 13, and a pressure indicative passage 17 communicating from the centrally protruding exterior portion 16 to a region 18 spaced therefrom. The chamber 11, the nipple 13, and the passages 14, 15, 17 are so arranged that the device 10 is conveniently positionable at the angle shown in FIG. 1 for delivery of the liquid 12 to an infant whose oral cavity 20 surrounds the ends 21,22 of the liquid conductive and the pressure indicative passages 15, 17, respectively, at the centrally protruding exterior portion 16 of the nipple 13, with the air inlet passage 14 communicating with the ambient atmosphere in substantially the same horizontal plane 23 at which the exterior end 21 of the liquid conductive metering passage 15 is positioned, and with the inner ends 24, 25 of the liquid conductive and the air inlet passages 15, 14, respectively, below the level 26 of the liquid 12 as long as the liquid 12 occupies a substantial portion of the space in the chamber 11 below an upper air space 27 therein.

The end 22 of the pressure indicative passage 17 at the centrally protruding exterior portion 16 of the nipple 13 is closely adjacent the exterior end 21 of the liquid conductive metering passage 15, and the pressure indicative passage 17 normally is filled with liquid.

The device of FIG. 1 comprises also means 30 for measuring the pressure in the pressure indicative passage 17. The pressure indicative passage 17 extends at 31 through the nipple 13 to a region outside the nipple 13 and the chamber 11, and the measuring means comprises a pressure transducer 30 connected to the extended end 31 of the pressure indicative passage 17. The pressure transducer 30 typically provides an electrical signal indicative of pressure to a signal conditioner 32 which amplifies the signal and otherwise modifies it if appropriate. The output of the signal conditioner 32 is fed to a recorder 34 which provides a graphic record 35 or other convenient record of the pressure detected in the pressure indicative passage 17.

As shown in FIG. 1, a nipple 13 of special design may be used with a conventional baby bottle 11. The metering tube 15 is sized so that the nutrient 12 delivered is of the volume normally encountered when an infant sucks with normal negative pressures. The flow and pressure characteristics of the metering tube 15 are also chosen to produce an essentially linear pressure-flow function over the range of interest. In this manner, if the pressure is measured, the flow (and volume) can be calculated. Similarly, if the flow is measured, the pressure can be calculated.

The air inlet tube 14 is positioned so that when the bottle 11 is in the normal use position the entrance to the air inlet 14 is at the same level 23 as the exit end 21 of the metering tube 15. Thus, the vacuum above the nutrient level 26 is such that the nutrient above the nipple exit 21 is just supported by atmospheric pressure.

The pressure transducer tube exit 22 is located close to the metering tube exit 21 and is filled with liquid during use. This is no problem since the tube 17 is normally filled with water when the nipple 13 is removed from the autoclave where it is kept when not in use. The oral pressure is measured and recorded as indicated at 35, and from the pressure and the known characteristics of the metering tube 15 the nutrient flow rate and total volume are computed.

There are a variety of clinically significant factors that are known to affect newborn sucking. These include drugs taken by the mother which cross the placenta and depress or excite the infant's central nervous system. For example, routine doses of obstetric sedation given by the obstetrician may depress the sucking response throughout the neonatal period, while maternal use of narcotic drugs will result in congenital addiction of the newborn. The congenitially addicted infant undergoes a stormy withdrawal period manifested by motor excitement and disruptive of adaptive responses including sucking behavior.

Usual treatment for congenital addiction and withdrawal is to titrate the dose of sedation or narcotic necessary to alleviate motor excitement without producing motor depression. This is difficult to achieve clinically using simple observation of infant behavior. If untreated, the withdrawal syndrome can lead to morbidity and death. The use of the measurement and recording system shown in FIG. 1 permits the clinician to follow the course of recovery from the symptoms of narcotic withdrawal and to monitor the effectiveness of treatment used to modify abnormal levels of central nervous system depression or excitation. For example, the normal sucking rate of a newborn is around 50 sucks per minute with a pressure of about −80 to −90 millimeters of mercury. Table 1 shows the range of responses among a group of passively addicted newborns undergoing treatment for withdrawal symptoms. The first three subjects were either inadequately treated or else probably over-sedated. The middle group also had not received sufficient sedation and may have been even still experiencing motor agitation that interfered with sucking response. Subjects 13 and 14 appear to have had about the optimal doses since they responded fairly close to normal.

TABLE 1

SUCKING DATA ON 14 PASSIVELY ADDICTED NEWBORN INFANTS

| Subject | Mean Pressure | Mean Rate | Treatment |
|---|---|---|---|
| 1 | — | 0 | Thorgtine |
| 2 | — | 0 | Phenobarbital |
| 3 | — | 0 | Phenobarbital |
| 4 | 64 | 7 | Phenobarbital |
| 5 | 86 | 11 | Phenobarbital |
| 6 | 100 | 20 | Paragoric |
| 7 | 96 | 20 | Phenobarbital |
| 8 | 75 | 24 | Phenobarbital |
| 9 | 93 | 28 | Phenobarbital |
| 10 | 78 | 29 | None |
| 11 | 92 | 33 | Paragoric |
| 12 | 116 | 36 | Paragoric |
| 13 | 88 | 46 | Phenobarbital |
| 14 | 100 | 48 | Phenobarbital |

Figure 2:
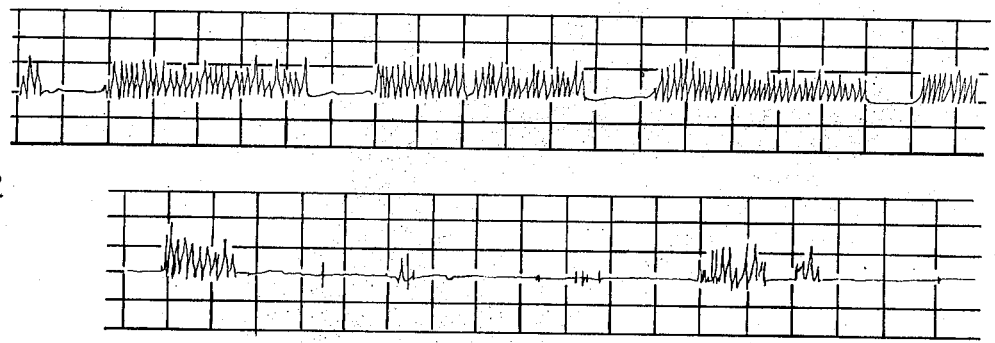
FIG. 2 is a reproduction of two recordings of sucking pressure against time as measured by the apparatus of FIG. 1.

FIG. 2 shows the behavioral individuality of two newborn infants. The infant producing the upper trace is representative of the high-rate, rhythmic sucking from a clinically healthy newborn during continuous reinforcement. The infant producing the lower trace is representative of the moderately slow, dysrhythmic sucking during continuous reinforcement. Disorganized sucking is considered characteristic of this particular infant who was "brain injured" at the time of delivery. Disorganized sucking behavior reflects functional or organic malfunction of the brain.

Other diagnostic applications include obtaining information about the level of maturation and development of brain functioning; studying the effects of prematurity, low Apgar rating (a measure of respiratory depression), brain injury, oral pathology and metabolic disorders upon the infant's sensory, motor, and central-analyzer functions; and preference testing among routine nursery nutrients. Reference for further details about these uses is made to "The Effect of Arousal and of Learning Upon Sucking Behavior in the Newborn," by Dr. Reuben E. Kron, Recent Advances in Biological Psychiatry, Volume 10. (Reference "A" in the Background section above.) Briefly, the technique involves the addition of an on-off valve in the nutrient flow passage, an audio, visual, or tactile indicator to alert the infant to the state of the on-off valve, and the means for measuring the adaption of the infant to the programmed schedule of nutrient reinforcement. This provides a means of studying intelligence and problem-solving abilities of the infant. An on-off valve is included in the embodiment of the invention shown in FIG. 3.

Figure 3:
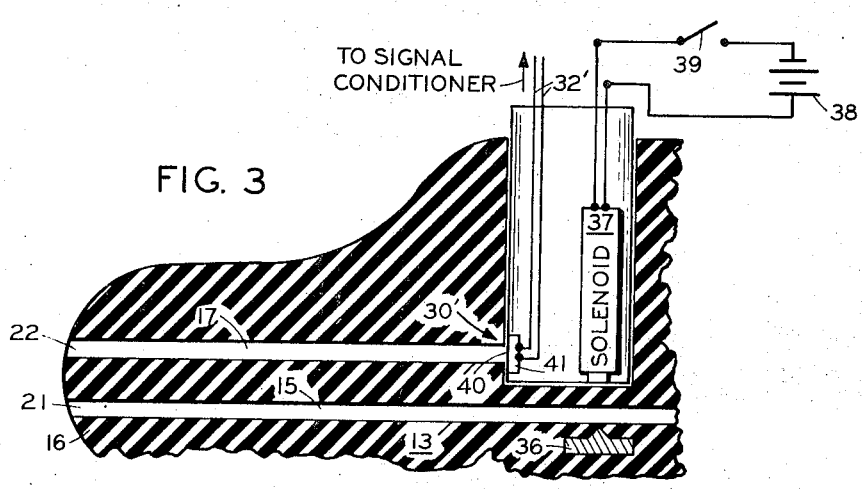
FIG. 3 is an enlarged sectional view of part of a modification of the apparatus of FIG. 1.

Referring now to FIG. 3, which shows part of a modification of the apparatus of FIG. 1, on-off valve means for selectively opening and closing the liquid conductive metering passage 15 comprises a member 36 that is movable in response to magnetic force on one side of the passage 15, electromagnetic means 37 on the opposite side, and a voltage source 38 and switch 39 for energizing, either manually or by a programming device, the electromagnetic means 37. The member 36 typically is made of magnetic material and the electromagnetic means 37 typically comprises a solenoid. When the switch 39 is open, the solenoid 37 is not energized and the liquid conductive passage 15 remains open as shown in FIG. 3. When the switch 39 is closed, the voltage source 38 energizes the solenoid 37, producing a strong magnetic field which attracts the magnetic member 36 pulling it toward the solenoid 37 and closing the liquid conductive passage 15. Where it may be desired that the liquid conductive metering passage 15 be normally closed, the member 36 may comprise a permanent magnet that is attracted to the solenoid 37 and closes off the passage 15 when the solenoid 37 is not energized. The winding of the solenoid 37 and the polarity of the voltage source 38 are chosen such that when the switch 39 is closed, energizing the solenoid 37, the magnetic field has the proper polarity to repel the permanent magnet 36 and thus to open the liquid conductive metering passage 15.

In the embodiment of FIG. 3 the pressure measuring means comprises a pressure transducer 30' in the pressure indicative passage 17. The transducer 30' comprises a diaphragm 40 and means 41, such as a strain gage, responsive to the deflection of the diaphragm 40. The strain gage 41 typically comprises a plurality of subminiature strain responsive resistors in an electrical bridge circuit, such as a Wheatstone bridge, with the output connected as indicated at 32' to a signal conditioner as in FIG. 1. The transducer 30' and the solenoid 37 may be mounted either permanently or removably in the nipple 13.

Figure 4:
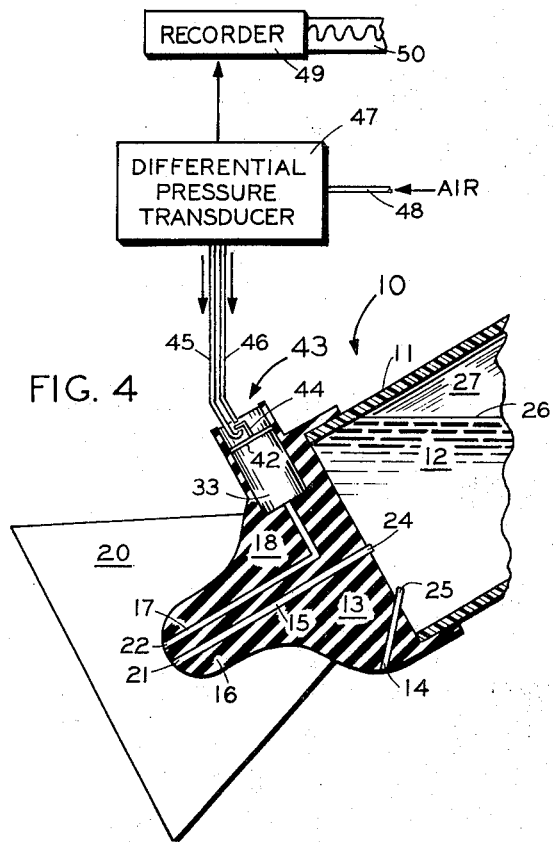
FIGS. 4-6 are partly schematic and partly sectional views of portions of other modifications of the apparatus of FIG. 1.

FIG. 4 shows another useful form of pressure measuring means in an enlarged end 33 of the pressure indicative passage 17 which comprises a diaphragm 42 and means 43 responsive to the deflection of the diaphragm 42. (Where desired, the diaphragm 42 in FIG. 4, or the diaphragm 40 in FIG. 3, may be located outside of the nipple 13, as is the pressure transducer 30 in FIG. 1.)

The deflection responsive means 43 comprises a flapper 44 connected to the diaphragm 42 for varying pressure differential in fluid lines 45 and 46, and indicating means responsive to the pressure differential therein. The indicating means comprises a differential pressure transducer 47 communicating with the fluid lines 45 and 46 and supplied with air through a fluid line 48, with the output of the transducer 47 connected to a recorder 49 which provides a graphic record 50.

As shown in FIG. 4, the diaphragm 42 is inserted, either permanently or removably, into and across the chamber 33 in the nipple 13 so that the diaphragm motion is proportional to the pressure in the oral cavity 20 and the pressure indicative passage 17. The diaphragm motion is sensed by means of the flapper 44 between two nozzles at the ends of the fluid lines 45 and 46 through which positive air flow is maintained from the air supply line 48. The differential pressure between the two airflow lines 45 and 46 is a function of the pressure in the oral cavity 20. This is a sensitive method which actually provides amplification of the oral pressure. The flow and volume of nutrient are calculated.

Figure 5:
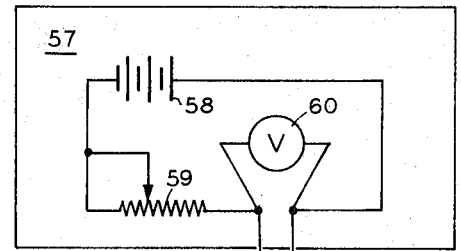
Figure 5:
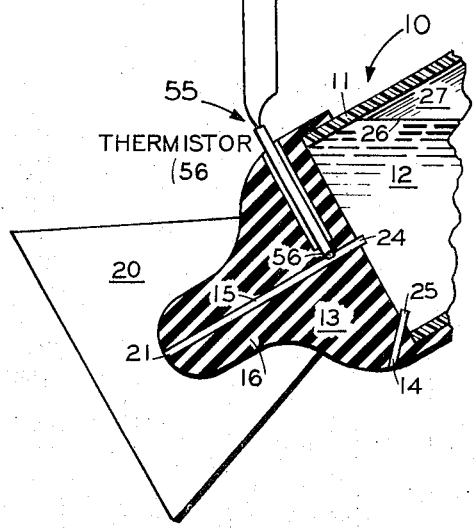
Figure 6:
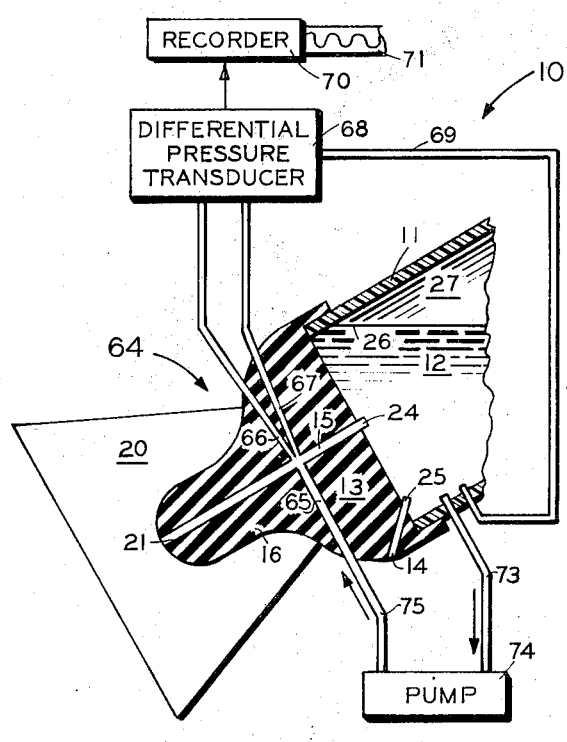

With the devices shown in FIGS. 5 and 6 one does not measure the pressure directly, but instead measures the rate of flow in the liquid conductive metering passage 15 and from its characteristics computes the pressure and total volume of flow.

The device in FIG. 5 includes means 55 for measuring the rate of flow in the liquid conductive metering passage 15. The flow measuring means 55 comprises means, such as a thermistor 56, responsive to the temperature in the passage 15. Also included is circuitry 57 comprising essentially a voltage source 58 and a variable resistance 59 for maintaining the thermistor 56 at a substantially constant temperature and a voltmeter 60 responsive to the temperature maintaining means 58, 59 for indicating the rate of flow in the liquid conductive metering passage 15 as a function of the temperature maintaining action. Of course other equivalent circuitry, with additional components where desired, may be substituted for that shown as a typical bare minimum circuit 57 in FIG. 5. Any suitable recording apparatus may be substituted for the voltmeter 60.

Alternatively, the circuitry 57 may be designed and operated in other essentially equivalent ways. For example, the voltage source 58 and the variable resistance 59 may provide a substantially constant current in the thermistor 56 and the voltmeter 60 indicates the rate of flow of liquid in the metering passage 15 as a function of the current maintaining action.

To recapitulate, the approach is to measure the flow, and from the characteristics of the metering tube 15 compute the pressure and total volume of nutrient flow. FIG. 5 shows a thermistor 56 inserted in the side of the nipple 13. The pressure conduit 17 is eliminated. The thermistor 56 protrudes into the metering tube 15. There are several methods by which the thermistor 56 may be used to measure the flow. The first is the constant temperature method. A small current from the voltage source 58 is passed through the thermistor 56, which heats it. As the nutrient 12 flows past, the thermistor 56 is cooled proportionally to the rate of flow. The current through the thermistor 56 is increased by reducing the series resistance 59 so as to maintain the thermistor temperature substantially constant. Thus, the current required to maintain constant thermistor temperature (the voltage measured by the voltmeter 60 being proportional to the current) is a function of the flow rate of the nutrient 12. The advantage of this system is that the thermal lag of the thermistor 56 does not enter into the problem.

In the present instrumented newborn nursing system, a response of several cycles per second is sufficient, and therefore another method, also illustrated in FIG. 5, is satisfactory. In this method, the thermistor 56 is connected to a constant current power supply 57. The flow of nutrient 12 cools the thermistor 56, changing its resistance. The voltage required to maintain the current constant, indicated by the voltmeter 60, is therefore a measure of the flow of nutrient. As stated above, from the measurement of the flow, and knowing the metering tube characteristics, the oral pressure and the total volume of nutrient may be calculated.

This method may be used also with a device of the type shown in FIG. 6, wherein the flow measuring means 64 comprises an input passage 65 in the nipple 13 substantially perpendicular to the liquid conductive metering passage 15 and communicating with one side of the passage 15 for passing fluid across it, a pair of output passages 66 and 67 in the nipple 13, substantially perpendicular to the metering passage 15 and communicating with the opposite side of the passage 15 in the vicinity of the input passage 65 and preferably substantially in line with it. Indicating means responsive to the differential pressures in the output passages 66 and 67 as shown in FIG. 5 comprises a differential pressure transducer 68 communicating with each output passage 66,67 and a recorder 70 responsive to the output of the transducer 68 to provide a graphic record 71. A fluid line 73 communicating with the nutrient 12 in the chamber 11 supplies the liquid nutrient to a pump 74 which pumps it through a fluid line 75 to the input passage 65. As the nutrient 12 flows through the input passage 65 and across the metering tube 15 it enters either one, both, or the other of the output passages 66,67 on the opposite side of the metering tube 15, depending on the magnitude of the deflection of the cross flow, which is a function of the main flow in the metering tube 15. The differential pressure between the two output passages 66, 67 is a function of the rate of flow of the nutrient 12 to the oral cavity 20 of the infant receiving the nutrient. Again, the pressure and volume may be computed from this measured flow.

Various other pneumatic and fluidic devices may also be incorporated into the nipple 13, either permanently or removably, for sensing the rate of flow of the nutrient 12 through the metering tube 15. Various modifications of and additions to the apparatus in the other figures may, of course, be made also.

The nipple 13 is shown in the drawings as a solid member except for the passages and spaces for other components. Where desired, part or nearly all of the nipple 13 may be hollow as long as the metering tube 15 and the pressure indicative passage 17 are made stiff enough that the flow is not responsive to mouthing and no pressure is introduced back into the bottle. The bottle may be of any conveniently usable type. It may be made either so as to be sterilizable and suitable for repeated use, or of throwaway material to be used only once.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

I claim:

1. An infant nursing device useful with means for measuring pressure and flow therein comprising
   a chamber for containing liquid therein
   a solid nipple contiguous to the chamber and having an air conductive passage communicating from the ambient atmosphere to the chamber, and
   a narrow tubular liquid conductive passage communicating from the chamber and through a centrally protruding exterior portion of the nipple,
   the chamber, nipple, and passages being so arranged that, when liquid is in the chamber, the device is conveniently positionable for delivery of the liquid to an infant whose oral cavity surrounds the centrally protruding exterior portion of the nipple, with the air conductive passage communicating with the ambient atmosphere in substantially the same horizontal plane at which the exterior end of the liquid conductive passage is positioned, and with the inner ends of the liquid conductive and the air conductive passages below the level of the liquid when liquid occupies a substantial portion of the space in the chamber.

2. A device as in claim 1, comprising also a narrow tubular pressure indicative passage in the nipple communicating from the centrally protruding exterior portion to a region spaced therefrom and responsive to pressure in the centrally protruding exterior portion.

3. A device as in claim 2, wherein the end of the pressure indicative passage at the centrally protruding exterior portion of the nipple is closely adjacent the exterior end of the liquid conductive passage.

4. A device as in claim 2, wherein the pressure indicative passage normally is filled with liquid.

5. A device as in claim 1, comprising also means for selectively opening and closing the liquid conductive passage.

6. A device as in claim 5, wherein the selective means comprises a member that is movable in response to magnetic force on one side of the liquid conductive passage, electromagnetic means on the opposite side, and means for energizing the electromagnetic means.

* * * * *